Jan. 5, 1971  F. FLOYD  3,552,099
GAS FILTERS
Filed April 29, 1968  2 Sheets-Sheet 1
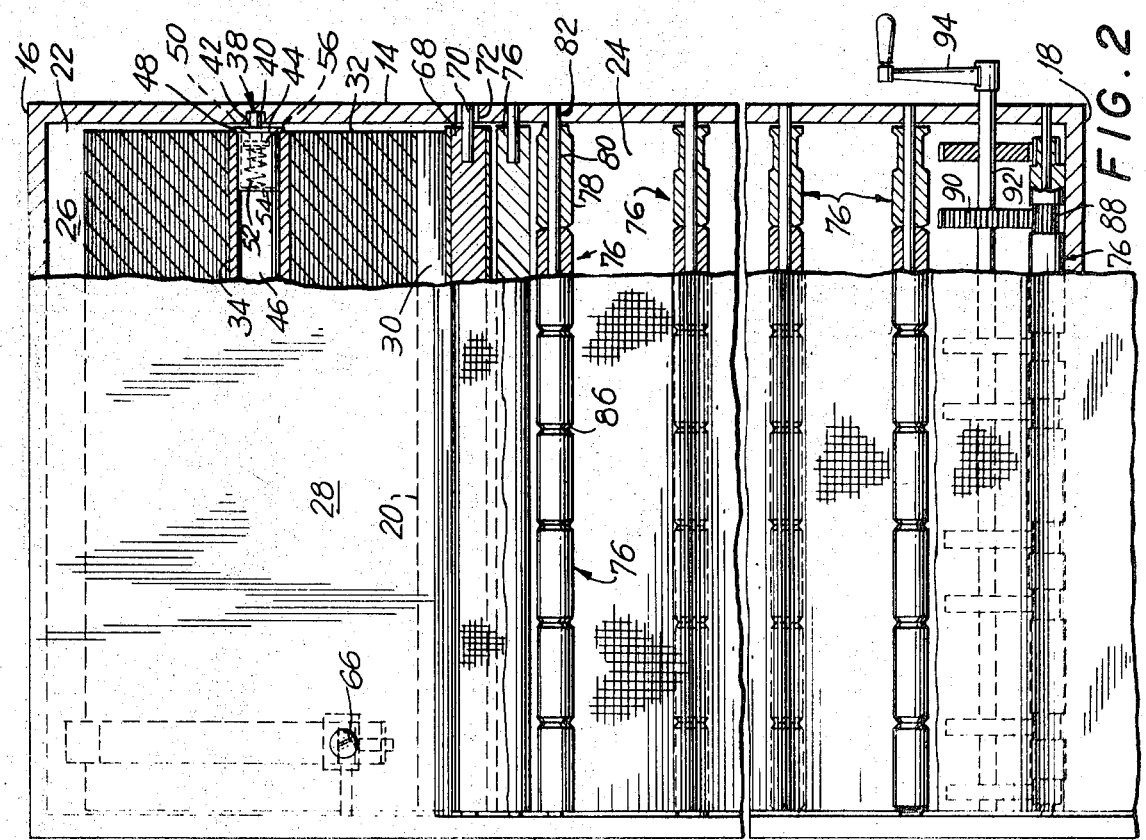
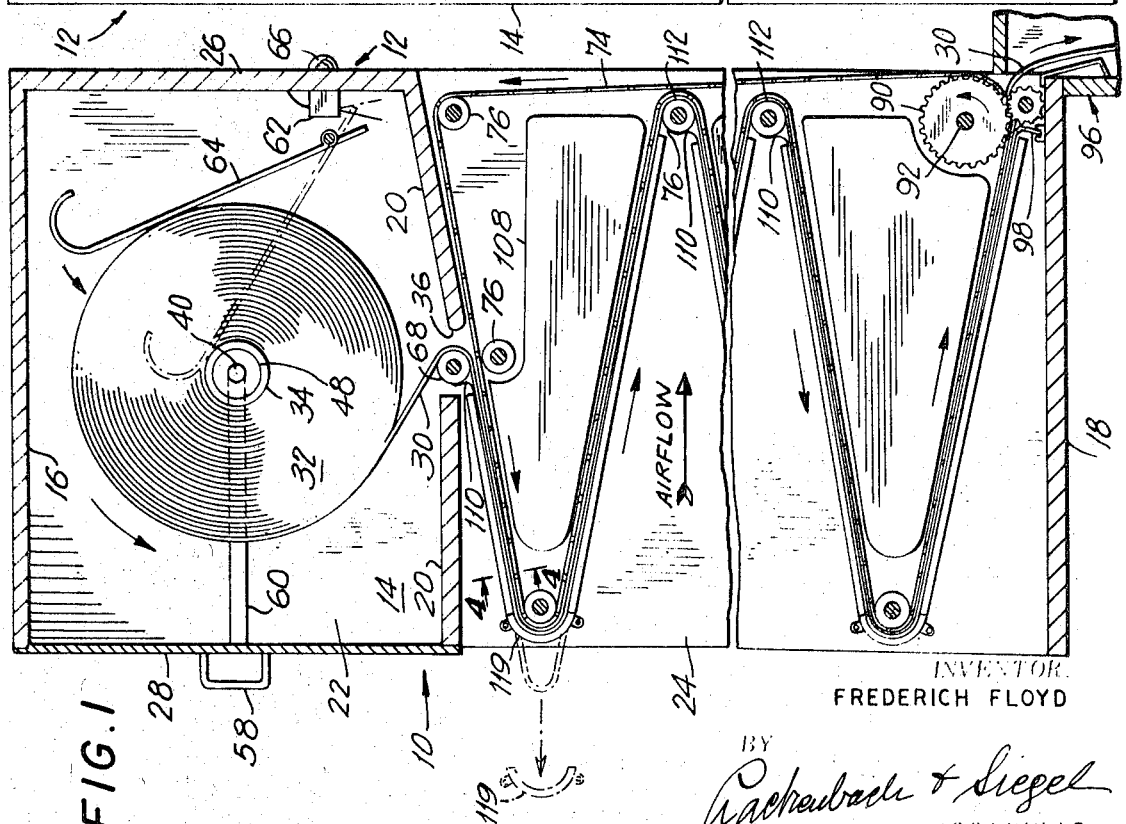
INVENTOR.
FREDERICH FLOYD
BY
Rachenbach & Siegel
ATTORNEYS Jan. 5, 1971  F. FLOYD  3,552,099
GAS FILTERS Filed April 29, 1968  2 Sheets-Sheet 2

INVENTOR.
FREDERICH FLOYD

BY
Rachenbach & Siegel
ATTORNEYS

United States Patent Office 3,552,099
Patented Jan. 5, 1971

3,552,099
GAS FILTERS
Frederich Floyd, Kent County, England, assignor to Ozonair Engineering Company Limited, Rochester, England, a British company
Filed Apr. 29, 1968, Ser. No. 724,964
Claims priority, application Great Britain, Apr. 27, 1967, 19,369/67
Int. Cl. B01d 46/22
U.S. Cl. 55—354                          7 Claims

ABSTRACT OF THE DISCLOSURE

A gas filter having a porous sheet conveyor supporting and moving a filtering web along a zig-zag path across a casing with flexible sealing strips mounted in channels extending along the sides of the casing.

---

This invention relates to gas filters and, more particularly, to air filters for utilization, for example, in heating, ventilating and air cooling systems.

It is a primary object of the present invention to provide novel and improved gas filters of high efficiency, particularly for filtration of air in heating, ventilating and air cooling systems.

Another primary object of the present invention, in addition to the foregoing object, is the provision of such filters constructed and arranged to enable the utilization of filter webs of low mechanical strength, such as unreinforced paper and fiber mattings.

Yet another primary object of the present invention, in addition to each of the foregoing objects, is the provision of such filters adapted to utilize such filtering mediums supplied in disposable roll form.

Yet still another primary object of the present invention, in addition to each of the foregoing objects, is the provision of such filters wherein an endless porous carrier supports such filter materials in a zig-zag pattern to provide reduced filter web velocity and increased efficiency.

Another and yet still further primary object of the present invention, in addition to each of the foregoing objects, is the provision of improved endless conveyor bands for utilization in such filters.

Another and yet still further primary object of the present invention, in addition to each of the foregoing objects, is the provision of novel and improved seals for utilization in such filters.

Yet still further, it is another primary object of the present invention, in addition to each of the foregoing objects, to provide such filters utilizing cheap rolls of filters mediums.

Yet still further, it is another primary object of the present invention, in addition to each of the foregoing objects, to provide novel and improved support means for rolls of filter material to insure that the resistance to the roll unwinding is not so great as to cause the paper to tear, and yet is sufficient to prevent the roll from over-running.

Another and yet still further primary object of the present invention, in addition to each of the foregoing objects, is the provision of such filters utilizing gas flow to aid in loading, aligning, and feeding the web of filter material.

The invention resides in the combination, construction, arrangement and disposition of the various component parts and elements incorporated in improved gas filters constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

According to the present invention a roll-type filter for air or other gas is furnished with a roll of filter materials which may be inexpensive and of low mechanical strength and means, such as a flexible, porous conveyor, for supporting and feeding the filter web from the roll to a compartment, preferably traversing a zig-zag path, and which acts as a filter for the air or gas. The roll of filter web may be mounted on a spool carriage having at its ends resilient bearing assemblies that insure that the resistance of the roll unwinding is not so great as to cause the filter web to tear and yet is sufficient to prevent the roll from overrunning and the conveyor may be provided with stationary means for sealing the edges of the filter web, which may be constructed and arranged to be readily replaceable. The air or gas flow through the compartment may be utilized to bring the leading edge of the filter web onto the conveyor band in correct alignment during initial loading, to maintain the seals properly disposed in gas-tight contact with the filter web and to maintain the filter web in contact with the endless conveyor band so as to satisfactorily convey the filter web in correct position throughout the zig-zag configuration.

In the drawing:

FIG. 1 is a side elevational, cross-sectional, pictorial illustration of gas filter apparatus constructed in accordance with the principles of the present invention;

FIG. 2 is a rear elevational illustration, partially in section, of the filter apparatus of FIG. 1;

Figure 3:
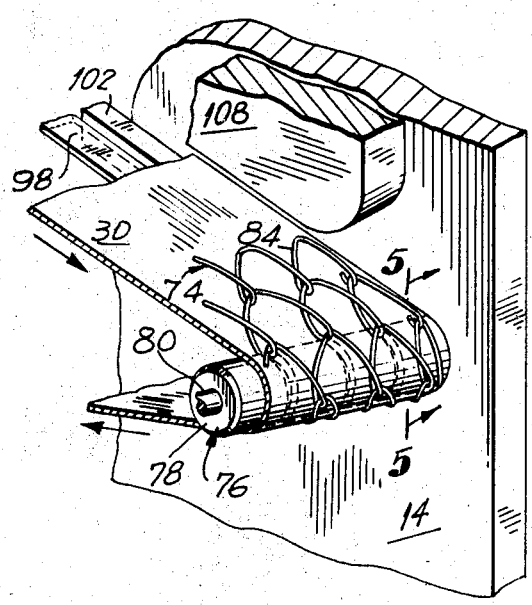
FIG. 3 is an enlarged, isometric illustration of a portion of the apparatus of the preceding figures.
Figure 4:
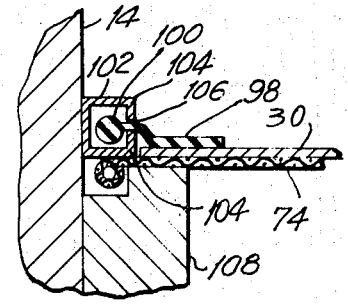
FIG. 4 is an enlarged partial elevational cross-sectional view taken along line 4—4 of FIG. 1.

With reference now to the drawing, and particularly to FIGS. 1 and 2 thereof, there is shown and illustrated filtering apparatus constructed in accordance with the principles of the present invention and designated generally by the reference character 10.

The filter apparatus 10 may comprise a casing or housing 12 which may be defined by generally parallel, spaced apart side panels 14, a top panel 16, a bottom panel 18 and a partition 20 disposed generally medially of the top panel 16 and the bottom panel 18 to define within the casing or housing 12 an upper compartment 22 and a lower compartment 24. The casing or housing 12 may further comprise a rear wall 26 which may be fixedly positioned between the top panel 16 and the partition 20 to further define the upper compartment 22. A movable panel or front wall 28 may be provided extending generally between the top panel 16 and the partition 20 to provide access to the upper compartment 22, as by being pivotally mounted to define an access door thereto. The front and rear of the lower compartment 24 may be generally open and unobstructed, enabling the apparatus 10 to be disposed in appropriate relationship to ducts, or the like, not shown, whereby the air or other gas flowing through the ducts will have to pass through the lower compartment 24 generally from front to rear thereof.

An elongated web of a filtering medium 30 may be utilized in the present invention, as by being furnished in the form of a roll 32 wrapped around a spool 34 adapted to be rotatably supported within the upper compartment 22. The partition 20 may be provided with an opening, such as an elongated, generally transverse slot 36 extending therethrough to enable the free end portion of the filter web 30 to be unwound from the roll 32 for passage into and through the lower compartment 24 and supported therein whereby the flow of air or other gas through the lower compartment 24 will pass therethrough, enabling entrapment therein of dirt or other filterable contaminants.

In accordance with the present invention, the spool 34 may be provided or supported in resilient bearing assemblies, generally designated by the reference character 38, that enable rotation of the spool 34 and, accordingly, unwinding of the filter web 30. At the same time, the bearing assemblies 38 may be constructed and arranged to provide sufficient friction or retardation of unrolling to prevent the spool 34 and associated roll 32 from overrunning. As an aid in enabling the web of filtering medium 30 to comprise a material of low mechanical strength, the bearing assemblies 38 may be constructed and arranged to provide the necessary resistance to rotation to prevent the roll from overrunning while yet enabling the roll to unwind easily without causing the web of filtering medium 30 to tear.

Accordingly, to provide the appropriate bearing action and resistance to rotation, the bearing assemblies 38 may comprise pins 40 adapted to be rotatably supported in recesses 42 provided in the side panels 14. The bearing assemblies may further comprise generally cylindrical casings 44 adapted to be received within a hollow passage 46 extending generally axially of the spool 34. The generally cylindrical casing 44 may further comprise a generally annular flange 48 extending generally radially outwardly and inwardly thereof to abut the end of the spool 34 and to define an aperture 50 through which the pin 40 is adapted to extend into the recess 42. Biasing means, such as a spring 52 may be contained within the cylindrical casing 44, abutting the bottom wall 54 thereof and a flange 56 extending generally radially outwardly of the pin 40. Accordingly, the spring loaded pins 40 support the spool 34 and associated roll 32 of filtering material 30 while providing sufficient resistance to prevent the spool from overrunning and yet being sufficiently free to avoid breakage of the filter web 30. As is believed readily apparent, the roll 32 of filter web medium 30 may be readily replaced through the access door 28 which may be opened or removed by means, such as, for example, a handle 58 provided structurally associated therewith.

As a further aid in positioning the spool 34 and associated roll 32, grooves 60 may be provided in the side walls or panels 14, extending from the front edges thereof generally rearwardly to the recesses 42, while being of a depth somewhat lesser than the depth of the recesses 42. Hence, with the door 28 open, a spool 34 provided with a roll 32 of filter web medium 30 may be readily positioned within the upper compartment 22 by disposing a bearing assembly 38 at either end of the spool 34, partially retracting the pins 40, inserting the pins 40 into the grooves 60 and sliding the assembly rearwardly, with the pins 40 being guided by the grooves 60, until the pins 40 engage the recesses 42. If desired, the forward end portion of the grooves 60 may be tapered, rounded, or the like, to aid in initially aligning and inserting the pins 40.

Signalling means, such as a switch 62 controlled by an actuating arm 64 adapted to ride against the roll 32, as by gravity or spring biasing, until a minimum diameter thereof is reached when the switch 62 will be actuated to activate an electrical circuit to an appropriate signalling device 66, such as a bell, warning light or the like, to indicate that a new roll 32 is required.

The filter web 30 may pass from the roll 32 through the slot 36 in the partition 20 and into the lower compartment 24, as by passing around a roller 68 provided generally within the slot 36. The roller 68 may be rotatably carried by the slide panels 14, as by means of pins 70 structurally associated with each end of the roller 68 and supported within apertures or bearings 72 provided in the slide panels 14. After passing around the roller 68, the filter web 30 may be carried by the air pressing the web onto an endless conveyor 74 and along a generally zig-zag path through the lower chamber 24. The conveyor 74 may be supported on a plurality of roller bars 76 which support the conveyor 74 and define the zig-zag path therefor. The roller 76 may, for example, comprise a plurality of roller sections 78 rotatably carried on shafts 80 mounted, in turn, in apertures 82 provided in the side panels 14. For example, as will be made clearer hereafter, there may be provided 8 support rollers 76 for supporting 3 zig-zag runs of the conveyor 74.

The conveyor 74 may be fabricated of substantially any desired porous material which is flexible, at least in one direction and may, for example, comprise a link chain or mesh which may, in turn, comprise a plurality of generally transversely elongated, hingedly interconnected conveyor elements of relatively limited length fabricated from substantially any material, such as perforated sheeting, wire, or the like. For example, and as indicated in FIG. 3, the conveyor 74 may comprise a plurality of intertwined, generally spirally wound wire forms or elements 84 which provide the requisite support for the filter web 30 while being capable of moving around the roller 76. The roller 76 may be provided with grooves 86 to engage the conveyor element 74, as shown, as a further aid in maintaining the conveyor 74 properly positioned on the roller 76.

Figure 3A:
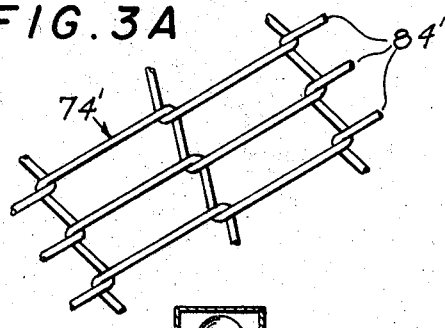
FIG. 3A is an enlarged isometric illustration of another type of conveyor suitable for use in this invention.
Figure 5:
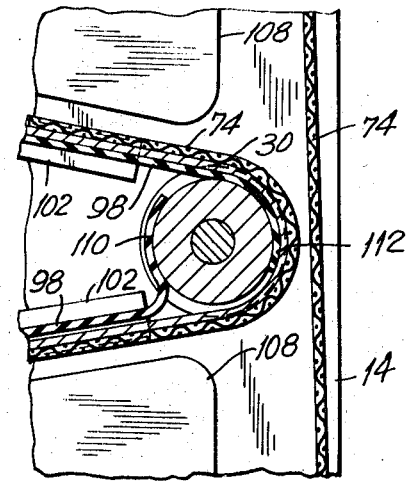
FIG. 5 is an enlarged cross-sectional view taken along line 5—5 of FIG. 3.

As indicated in FIG. 3A, the conveyor 74 may comprise a plurality of wires 84' running generally horizontally across the filter. For example, the wires 84' may be of approximately $\frac{1}{16}''$ diameter and spaced approximately $\frac{1}{4}''$ apart. The wires 84' may be twisted, for example, every three inches to provide interconnection therebetween and to give strength to the conveyor wire pattern. These twists may engage in the grooves 86 and rollers 76 to maintain the conveyor 74 properly positioned on the rollers 76.

One of the rollers 76 may be provided with means, such as generally radially outwardly projecting spikes or protuberances, or, as shown and illustrated, with gear portions 88 adapted to mesh with drive gears 90, carried for example, on a shaft 92 operatively associated with driving or rotating means, which may be manual, automatic, powered, or the like, and may, for example, merely comprise an operating handle or crank 94. The drive gear 90 might also engage the conveyor 74, as by engaging the $\frac{1}{4}''$ spaced apart wires 84' of the conveyor 74'. Yet further, one or more of the rollers 76 may be adjustable or may be spring biased to adjust for slack or stretching of the conveyor 74, and to provide proper tensioning thereof. It is to be understood, of course, that other forms of conveyors 74, such as conventional wire screening, chain, perforated metal, plastic, or the like, woven wire, plastic, fabric, or the like, etc., may be utilized rather than the particular conveyor form shown and illustrated.

The filter web 30 may be fed onto the conveyor 74 by feeding the end of the filter web 30 through the slot 36 behind the roller 68 while the main airflow is on. The air will draw the filter web 30 onto the conveyor 74 and rotation of the drive gears 90 by the handle 94 will cause the conveyor 74 to feed the filter web 30 along the zig-zag path, and between the meshing gears 88 and 90 to fall by gravity into a disposal bin 96.

At the end of the effective run of the conveyor band, a blanking strip may be interposed between the paper and the band so as to prevent the paper from clinging to the band and to enable it to be fed out of the apparatus, if desired.

As is now believed readily apparent, the conveyor 74 may support the filter web 30 sufficiently so that the filter web 30 may comprise cheap, limp material of low mechanical strength, such as various open paper types, glass fiber blankets, acetate and acrylic and other man-made fibers, and the like.

For example, an air filter medium which has been found to be particularly suitable for use with the air filter apparatus of the present invention, particularly when utilized for secondary filter applications, consists of 0.003" thick layers of paper comprising randomly laid wood pulp fibers of approximately 10 to 25 micron diameter. This medium provides sufficient surface irregularities so as to be similar to a light crepe effect. These surface irregularities enable an increased surface area to be achieved to enable the collection of atmospheric dust. This filter medium is basically processed in water and is accordingly, highly adsorbent, and may be impregnated with silicone.

The mesh hole size of this filter medium is such as to permit a pressure drop across the medium of 0.3 to 0.4 at a filter velocity of approximately 100 feet per minute, or a cubic capacity of approximately 100 cubic feet per minute per square foot. When utilized to filter atmospheric dust having a particle size range of 1 to 2 microns, such a filter medium provides a blackness efficiency of 30–40% and, accordingly, is effective and efficient as a secondary type of air filter for atmospheric dust and carbonaceous material including fly dust.

Moreover, the zig-zag design provides a lower filter web velocity than would obtain if the filter web were not arranged in the zig-zag configuration, which enables higher filtering efficiency. It is to be noted that all portions of the zig-zag path, the filter web 30 is disposed on the upstream side of the conveyor 74 so that the gas flow may maintain the filter web 30 in contact with the endless conveyor 74 so as to satisfactorily convey the filter web 30 in the correct position throughout the zig-zag path.

The zig-zag runs of the filter web 30 and the conveyor belt or chain 74 may be sealed, for example, at both sides by narrow strips of material 98 which may be structurally associated with the side panels 14 and engaged in close contact with the filter web 30 by the force of the airflow. The strips 98 may comprise substantially any desired nonporous or only slightly porous material, such as a flexible polyethylene, woven or knit fabric, or the like. The side seals or strips of material 98, when engaged with the filter material 30 must, however, be substantially gas tight. The strips 98 may, for example, comprise a linen ribbon and may, for example, be held in position by beaded edges 100 provided thereon and engaged within tracks 102 which may, in turn, be structurally associated in any desired manner with the side seals 14. The tracks 102 may, for example, comprise extrusions having leg portions 104 extending generally towards each other to define therebetween a narrow slot 106 with the ribbon 98. The ribbons or strips 98 may overlap the raw edges of the filter edges 30 and the suction of the airflow may draw the ribbon 98 into close contact with the filter web 30 which, as heretofore pointed out, is also in close contact with the conveyor 74. To resist the movement of the conveyor 74 away from the ribbon or strips 98 due to the force of the airflow, flanges 108 may also be structurally associated with the side panels 14 on the downstream side of the conveyor 74.

The ribbons or strips 98 may, for example, comprise separate strips down each side of the filter of sufficient length to form one complete V or run of the zig-zag shape with the upper end portion of each strip 98 extending generally forwardly of the adjacent roller, as indicated by the reference character 110, and the lower end portion of the strip 98 being disposed generally rearwardly of the adjacent roller, as indicated by the reference character 112. The ribbons 98 may be adapted to be readily replaced, as by removing a suitable extrusion cap portion (not shown) provides adjacent each of the forward ones of the rollers 76, as indicated in phantom in FIG. 1, enabling the strips 98 to be readily removed and replaced from the tracks 102.

Each of the runs or V's of the zig-zig path may be of substantially the same length, enabling each of the side seals 98 to be of a constant size, enabling such seals to be produced in bulk at a very low cost for replacement purposes.

Thus, the seals or ribbons 98 may provide regions at the side edges of the filter web 30 whereat no airflow occurs. The width of the filter web 30 may, for example, be approximately ½" less than the width of the casing, or the width between the side walls 14, providing approximately ¼" clearance between the web 30 and the side panels 14 on each side. Then, if the ribbons 98 are, for example, 1" wide which when fitted inside the tracks 102 make a combined blank width of 1¼". It follows, therefore, that the filter web 30 may be up to 1¼" away from the side panels 14 while still enabling the effectuation of a positive seal. If the pressure drop across the filter web 30 increases with increased dust load, the flexible sealing strips 98 would then be drawn onto the filter web 30 with even greater effect to preclude the passage of dust through the filter unit. The smoothness of the ribbons or strips 98 relative to the filter web 30 allows the filter web 30 to travel freely into the disposal bin.

To enable the filter web 30 to pass uniformly downwards with the conveyor 74 during loading so as to prevent a wander resulting in a pileup of material down one side of the casing and a breakdown of the seal on the other, it is desirable that the spool 48, slot 36 and top roller 68 be precisely parallel to one another. However, as heretofore pointed out, airflow actually holds the filter web 30 onto the conveyor 74. For example, the top roller 68 may be approximately 1½" in diameter. The handle 94 may, obviously, be replaced by some other driving means, such as a ratchet, rocking handle, or pressure or time switch controlled electric motor, or the like. It has been found effective, however, and particularly for secondary air filtration with a cubic flow of 100 cubic feet per minute per square foot of filter web, to provide a gear reduction motor drive having a speed of one revolution of the output shaft which results in a linear speed of the filter web 30 of 1" every 8 hours, which is generally sufficient to enable a constant pressure drop to exist. Obviously, however, under exceedingly dusty conditions or other operating parameters, differing gear box and web drive speeds could be utilized.

Figure 6:
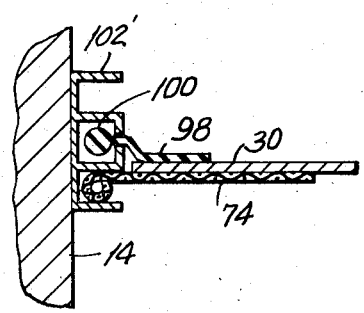
FIG. 6 is a view similar to FIG. 4 showing another sealing arrangement.

With reference now to FIG. 6, there is shown and illustrated another embodiment or modification of the present invention wherein a single track extrusion 102' may be utilized to provide the functions of both the track 102 and the flanges 108, as is believed readily apparent.

It is to be noted that filters for secondary applications are usually rated for efficiency of particle collection in terms of the atmospheric blackness method. In accordance with this method, the usual roll type automatic filter for primary applications gives approximately 10% efficiency when operating at a filter web velocity of 500" per minute. By reducing the filter web velocity to 100" per minute using the zig-zag design, conventional filter webs are capable of producing efficiencies between 30–40% efficiency by atmospheric blackness method. Heretofore known filter webs when used on roll type automatic filters, require reinforcement cotton netting to withstand the high loads due to the airflow and mechanical passage through the filter path. These reinforcement nettings in some cases are almost the same price as the filter web itself which together with the cost of joining the netting to the web result in a high replacement roll cost. These same materials, without the netting, besides being cheaper, become limp and of low mechanical strength. At the same time, using a zig-zag design of endless chain, the filter web velocity may be reduced to give improved efficiency.

Figure 7:
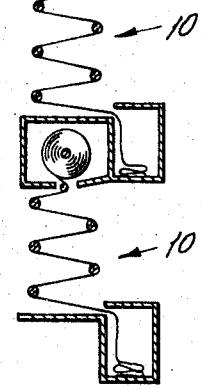
FIG. 7 is a schematic illustration of a filtering assembly comprising a plurality of filtering apparatus as shown in FIGS. 1 and 2.

It is important to note that gas filters constructed in accordance with the present invention are particularly adapted to enable mass production thereof. Accordingly, gas filters constructed in accordance with the principles of the present invention are preferably manufactured in standard size units, with the duct of the air conditioning plant in which the unit is to be used being altered to suit the size of the filter unit, rather than the filter unit being custom built for the particular duct. If large ducts are present in an air conditioning plant, the number of filter units may be increased, and multiple filter units may be provided in tandem, as indicated schematically in FIG. 7. Moreover, the inclination of the zig-zag path and the number of V-shaped runs therein are relatively critical in respect to the size of the unit, to enable proper filtration. For example, units may be fabricated in accordance with the principles of the present invention which have inlet and outlet openings which are approximately 2″ high and 2″ wide wherein there are provided three V shaped runs of conveyor, each V being approximately 21° included angle. Accordingly, the inlet and outlet area would be approximately 4 square feet, but the filter area would be approximately 20 square feet (2″ wide x 10″ long). Hence, with a duct or inlet velocity of 500″ per minute, the filter would handle 2,000 cubic feet of air per minute. However, since the effective filter area is 20 square feet, the filter velocity would be only 100 feet per minute and the filter volume would be reduced to 100 cubic feet per minute per square foot. With these dimensions, utilizing the filter medium described above, filters fabricated in accordance with the present invention may exhibit a blackness efficiency of 30–40%. Other features of the invention are satisfied by the above configuration, that is, non-tearing of the filter medium, the filter medium being supported on an endless conveyor along all of the paths of the filter medium, desired edge sealing, etc.

If greater than 2,000 cubic feet per minute capacity is required, then the units may be tandemed or paralleled, to provide capacity in multiples of this figure, readily and easily, enabling mass production and standardized replacement components.

While the invention has been described, disclosed, illustrated and shown in terms of certain preferred embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and spirit of the claims hereto appended.

What is claimed is:

1. Gas filter comprising, in combination, a casing having inlet and outlet openings at opposed sides, a roll of disposable filter web having low mechanical strength mounted adjacent said casing, slot means at one end of said casing for guiding said filter web to a porous sheet conveyor means disposed in a zig-zag track fashion across said casing, said conveyor means supporting and conveying said porous filter web across said casing along a zig-zag path to enable substantially all of the gas flowing therebetween to pass through said filter web and to maintain same in close contact with said conveyor means along said zig-zag track fashion, means for driving said conveyor means, and sealing means comprising channel elements mounted in a zig-zag track fashion, having slot means for retaining sealing strips, disposed along the side walls of said casing adjacent a zig-zag track of said conveyor means, said sealing means comprising flexible strips each having longitudinal beads along an outer edge thereof structurally associated within said channel elements and being disposed in substantially tight engagement with said filter web along outer portions thereof, said sealing strips being substantially coextensive with said outer portions of the filter web, the gas flowing through said filter web and then said porous conveyor means from one side to the other side of said casing, the outer portions of said filter web being disposed by fluid pressure in tight engagement with said flexible strips to preclude the flow of gas therearound, and said track comprising flange means disposed on the side walls of said casing adjacent said channel elements and generally downstream of said conveyor means adjacent the edges thereof for resisting the movement of said conveyor means away from said strips.

2. The gas filter according to claim 1, wherein said strips comprise a material having the characteristic of linen.

3. The gas filter according to claim 1, wherein said track of said conveyor means is in the form of a plurality of generally V-shaped portions.

4. The gas filter according to claim 3, including rollers disposed adjacent the rearward ends of said V-shaped portions, said strips comprising a plurality of strip portions, the upper end portions thereof being adapted to be disposed generally forwardly of said rollers and the lower end portions being adapted to be disposed generally rearwardly of said rollers.

5. The gas filter according to claim 1, wherein said conveyor means comprise manipulative, interconnected elements which form a flexible conveyor.

6. The gas filter according to claim 5, wherein said elements comprise wire elements in the form of a mesh.

7. The gas filter according to claim 6, further comprising a plurality of rollers for supporting said conveyor means for movement in said zig-zag path, at least one of said rollers being provided with circumferentially extending grooves for engaging porous sheet in maintaining said conveyor means laterally positioned relative to said rollers.

References Cited

UNITED STATES PATENTS

| | | | |
|---|---|---|---|
| 660,027 | 10/1900 | Proctor | 210—400 |
| 1,982,639 | 12/1934 | Christofferson | 55—354 |
| 2,076,305 | 4/1937 | Strindberg | 55—354 |
| 2,119,978 | 6/1938 | Wolthius et al. | 55—354 |
| 2,133,931 | 10/1938 | Walker et al. | 55—354 |
| 2,869,680 | 1/1959 | Fields | 55—354 |
| 2,875,680 | 3/1959 | Forshee | 55—354 |
| 3,019,855 | 2/1962 | Engle | 55—352 |
| 3,071,936 | 1/1963 | Irwin | 55—351 |
| 3,077,990 | 2/1963 | Peterson | 210—401 |
| 3,324,633 | 6/1967 | Revell | 55—354 |
| 1,142,982 | 6/1915 | Richardson | 55—353 |
| 2,133,931 | 10/1938 | Walker | 55—351 |
| 2,850,113 | 9/1958 | Turner | 55—353 |
| 3,350,854 | 11/1967 | Revell | 55—354 |
| 3,395,518 | 8/1968 | Krane | 210—401 |

FOREIGN PATENTS

| | | | |
|---|---|---|---|
| 864,484 | 4/1961 | Great Gritain | 55—354 |
| 961,365 | 6/1964 | Great Britain | 55—354 |
| 1,009,570 | 11/1965 | Great Britain | 55—354 |

FRANK W. LUTTER, Primary Examiner

B. NOZICK, Assistant Examiner